US011927460B2

(12) United States Patent
Hewitt et al.

(10) Patent No.: US 11,927,460 B2
(45) Date of Patent: Mar. 12, 2024

(54) CONTROL OF DIVERSE TYPES OF CREW INTERFACE FOR FLIGHT CONTROL

(71) Applicant: BAE SYSTEMS plc, London (GB)

(72) Inventors: Charlie Hewitt, Rochester (GB); Philip Lamb, Rochester (GB); James Austen Harrison, Rochester (GB); Antony Kershaw, Rochester (GB)

(73) Assignee: BAE SYSTEMS PLC, London (GB)

( * ) Notice: Subject to any disclaimer, the term of this patent is extended or adjusted under 35 U.S.C. 154(b) by 255 days.

(21) Appl. No.: 16/757,603

(22) PCT Filed: Oct. 24, 2018

(86) PCT No.: PCT/GB2018/053074
§ 371 (c)(1),
(2) Date: Apr. 20, 2020

(87) PCT Pub. No.: WO2019/081924
PCT Pub. Date: May 2, 2019

(65) Prior Publication Data
US 2020/0264010 A1    Aug. 20, 2020

(30) Foreign Application Priority Data
Oct. 25, 2017 (EP) ................................ 17275172
Oct. 25, 2017 (GB) ................................ 1717544

(51) Int. Cl.
*B64D 45/00* (2006.01)
*G01C 23/00* (2006.01)

(52) U.S. Cl.
CPC .......... *G01C 23/005* (2013.01); *B64D 45/00* (2013.01)

(58) Field of Classification Search
None
See application file for complete search history.

(56) References Cited

U.S. PATENT DOCUMENTS 5,713,007 A * 1/1998 Lecomte ................ G05B 17/02
701/14
7,714,744 B1 * 5/2010 Wichgers .............. G08G 5/045
340/963
(Continued)

FOREIGN PATENT DOCUMENTS

WO    2019081924 A1    5/2019

OTHER PUBLICATIONS

International Search Report and Written Opinion received for PCT Application No. PCT/GB2018/053074, dated Nov. 30, 2018. 14 pages.

(Continued)

*Primary Examiner* — Adam D Tissot
*Assistant Examiner* — Michael T Silva
(74) *Attorney, Agent, or Firm* — Finch & Maloney PLLC

(57) ABSTRACT

Diverse types of crew interfaces (400, 430, 450) are provided for outputting visible, audio and tactile information to a pilot for flight control. A unified estimation of the current aircraft state and of a current phase of flight are made (110), based on flight status information. Respective coordinated visible, audio and tactile presentations for the diverse types of crew interfaces are generated, (120) coordinated so that they provide mutually consistent indications of the unified estimation of the current aircraft state, according to the unified estimation of current flight phase. The respective coordinated presentations are output (130) by the diverse types of crew interfaces to the pilot. By coordinating crew interface outputs across sight, sound and touch senses, this can relieve the pilot of workload in interpreting unsynchronised or incoherent outputs from different types of interfaces.

23 Claims, 12 Drawing Sheets

(56) References Cited

U.S. PATENT DOCUMENTS

| | | | |
|---|---|---|---|
| 8,193,948 B1 | 6/2012 | Shapiro et al. | |
| 8,386,092 B1 | 2/2013 | Carrico et al. | |
| 9,245,450 B1* | 1/2016 | Chiew | G08G 5/0047 |
| 10,302,450 B1* | 5/2019 | Doty | G01C 23/00 |
| 10,514,707 B1* | 12/2019 | Carrico | B64D 45/00 |
| 2004/0056762 A1 | 3/2004 | Rogers | |
| 2004/0056952 A1 | 3/2004 | Konya | |
| 2007/0050140 A1 | 3/2007 | Matuska et al. | |
| 2007/0142980 A1* | 6/2007 | Ausman | G01C 23/00 |
| | | | 701/3 |
| 2007/0282491 A1 | 12/2007 | Cox et al. | |
| 2010/0169014 A1 | 7/2010 | Huynh et al. | |
| 2010/0292912 A1 | 11/2010 | Palanichamy et al. | |
| 2011/0295448 A1 | 12/2011 | Broquet et al. | |
| 2013/0245860 A1* | 9/2013 | Cooper | G01C 23/00 |
| | | | 701/14 |
| 2013/0268146 A1* | 10/2013 | Baudry | G06F 3/011 |
| | | | 701/3 |
| 2014/0200748 A1* | 7/2014 | Porez | G05B 23/0272 |
| | | | 701/3 |
| 2014/0257603 A1* | 9/2014 | McKeown | G08G 5/0021 |
| | | | 701/16 |
| 2014/0350753 A1 | 11/2014 | Depape et al. | |
| 2015/0052994 A1* | 2/2015 | Dupont De Dinechin | G01P 21/025 |
| | | | 73/180 |
| 2015/0054664 A1* | 2/2015 | Dupont De Dinechin | G01C 23/00 |
| | | | 340/973 |
| 2016/0093223 A1* | 3/2016 | Caudron | B64D 45/00 |
| | | | 701/3 |
| 2016/0178364 A1* | 6/2016 | Walter | G01P 21/00 |
| | | | 702/94 |
| 2017/0310749 A1* | 10/2017 | Vasek | H04L 65/1069 |
| 2018/0075757 A1* | 3/2018 | Estes | G08G 5/025 |

OTHER PUBLICATIONS

GB Search Report under Section 17(5) received for GB Application No. 1717544.9 dated Mar. 9, 2018. 3 pages.

Extended European Search Report received for EP Application No. 17275172.9, dated May 3, 2018. 7 pages.

Combined Search and Examination Report under Sections 17 and 18(3) recieved for GB Application No. 1817288.2, dated Apr. 24, 2019. 7 pages.

GB Search Report under Section 18(3) received for GB Application No. 1817288.2 dated Aug. 10, 2020. 3 pages.

GB Search Report under Section 18(3) received for GB Application No. 1817288.2 dated Mar. 26, 2021. 4 pages.

International Preliminary Report on Patentability received for PCT Application No. PCT/GB2018/053074, dated May 7, 2020. 8 pages.

* cited by examiner

CONTROL OF DIVERSE TYPES OF CREW INTERFACE FOR FLIGHT CONTROL

This disclosure relates to diverse types of crew interfaces for flight control, such as those in aircraft cockpits, or for ground based control of drone aircraft and so on.

It is known to provide a pilot with multisensory interfaces to interface with senses such as sight, sound, 3D sound, and touch. For the sense of sight there are displays such as head up displays HUD, head mounted displays, HMD and head down displays HDD or instruments. For the sense of sound there are audible warnings which may be 3D in the sense of having a detectable direction or changes of direction. For the sense of touch there can be tactile feedback in the sense of amount of resistance or amount of vibration felt in in the control stick or in the throttle levers or rudder pedals for example.

In current systems there are many aircraft sensors feeding input to separate control systems, some of which may feed information to the pilot about the state of the aircraft or the current phase of flight using more than one of the human senses. However, the different systems are not always synchronised or consistent. For example for each phase of flight such as taxi, take-off, cruise, approach, touchdown and braking, the crew interfaces fed by different sources such as different sensors may not be entirely consistent with each other, or consistent with the particular phase of flight. Also, during transitions between these phases, the different systems may decide independently that the phase has changed, and thus they may indicate the phase transitions at slightly different times, or not indicate the phase changes. Such inconsistencies can provide an incoherent impression of the aircraft state which usually can be overcome and understood by the pilot if they know the different characteristics and timings of the different systems, and so with that knowledge the pilot can still deduce whether any inconsistencies represent a normal situation or an equipment malfunction or a dangerous state for example. But this requires the pilot to apply detailed knowledge and integrate various inputs to judge the situation and understand immediately the state of the aircraft and what should be done. In some cases this adds to a risk of the pilot becoming overloaded or confused.

There have been many attempts to aid pilots to reduce pilot overload, such as providing checklists, providing additional warnings when thresholds are breached, and providing more highly processed status information such as predictions of trajectories and differences relative to flight plans, and providing more graphical representations of data. The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. There is provided a method of controlling respective outputs of diverse types of crew interfaces for outputting visible, audio and tactile information to a human pilot for flight control of an aircraft, having steps of: receiving flight status information from multiple different sources, and determining unified estimations of current aircraft state and of current phase of flight, based on at least the flight status information from the multiple different sources. From this, there is a step of generating respective coordinated visible, audio and tactile presentations for the diverse types of crew interfaces, coordinated so that they provide mutually consistent indications of the unified estimation of the current aircraft state, according to the unified estimation of the current phase of flight.

Other features may be added in particular embodiments, such as, the mutually consistent indications of the state of the aircraft comprising mutually consistent indications of at least one of: proximity to a desired flight control parameter, proximity to an undesired flight control parameter, and flight control correction guidance. Another additional feature is the step of generating the respective presentations being coordinated by synchronising changes in the indications in response to changes in the unified estimation of the current state of the aircraft. The diverse types of crew interfaces can comprise a visual type, an audio type, and a tactile type, the visual type comprising a at least one of: a head down display, a head up display and a head mounted display, the audio type comprising headsets or cockpit loudspeakers each optionally providing 3D audio, and the tactile type comprising at least one of: a throttle tactile output, a rudder pedal tactile output, and a stick tactile output.

Generating the respective coordinated visible, audio and tactile presentations can be coordinated by synchronising changes in the mutually consistent indications of the aircraft state in response to changes in the unified estimation of current phase of flight. The step of determining a unified estimate of phase of flight can involve determining a unified estimate based on flight status information comprising at least a flight plan, a current location, and aircraft status information.

Determining a unified estimate of current phase of flight can involve determining the phase is one of: an approach phase, a take off phase, cruise phase, touch down phase, a braking phase, or a taxi phase.

Another aspect provides a corresponding controller for controlling respective outputs of diverse types of crew interfaces for outputting visible, audio and tactile information to a human pilot for flight control, the controller having a processing circuit and a memory circuit, the memory circuit having instructions executable by the processing circuit, wherein said processing circuit when executing the instructions is configured to use the methods set out above. Another aspect provides a crew interface system comprising such a controller. Other aspects provide corresponding computer programs and computer program products.

BRIEF DESCRIPTION OF THE DRAWINGS

Embodiments of the invention will be described, by way of example, with reference to the following drawings, in which.

DETAILED DESCRIPTION

Figure 1:
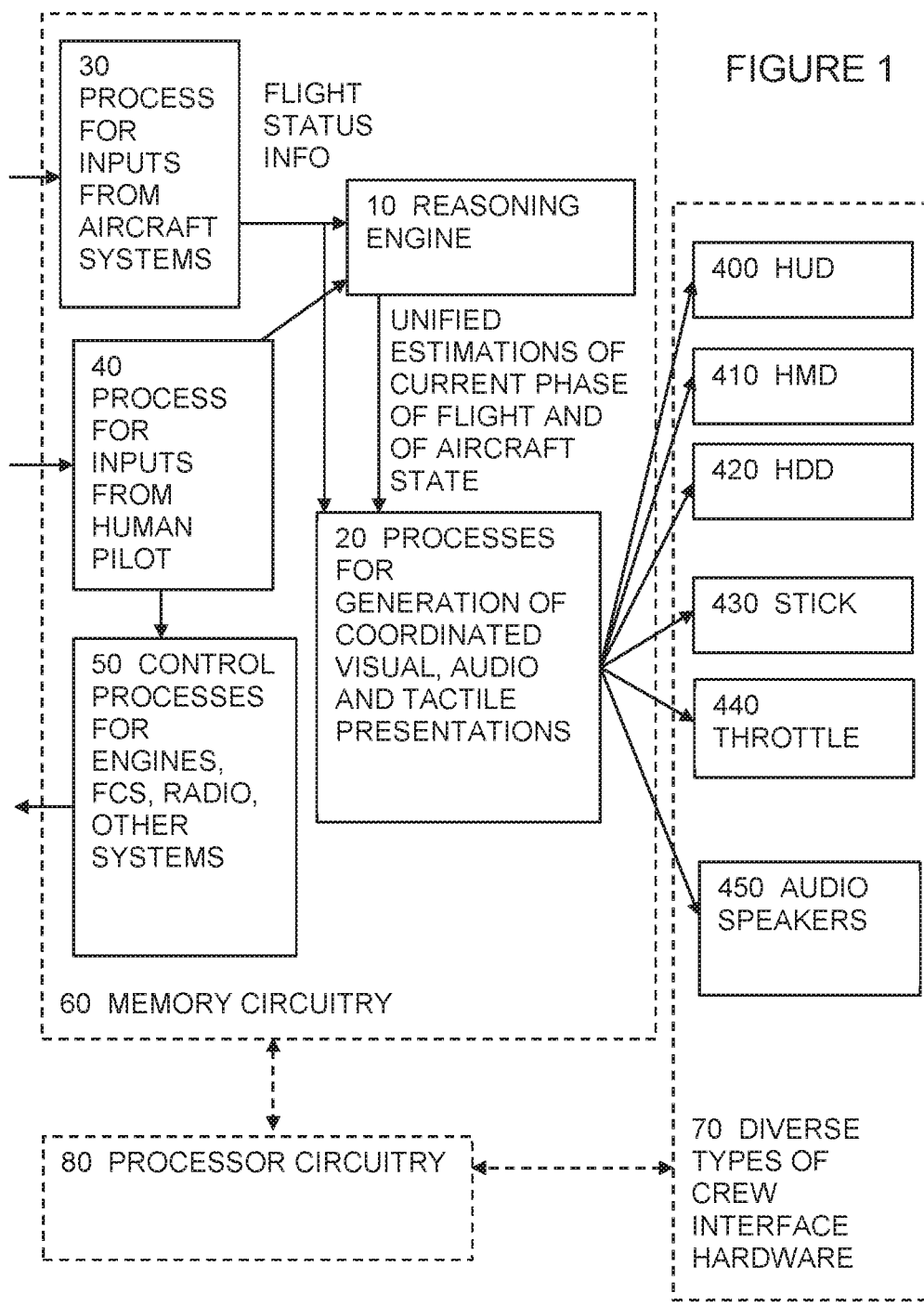
FIG. 1 shows a schematic view of a first embodiment.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

By way of introduction, some issues with current technologies will be set out briefly. For a pilot controlling an aircraft, there are many systems giving them information, for example on final approach where the aim is to provide guidance to acquire and maintain a glideslope, there may be different systems controlling the displays, the audio warnings and the tactile outputs on the stick and throttle. The pilot receives indications or notices changes in indications that are not synchronised or coordinated and so the pilot is left to interpret what is the current state of the aircraft and what might happen next from the multiple possibly differing sources. One current system is an Instrument Landing System ILS which primarily gives a visual indication. There is also an audio output to give an indication of when you have just flown over a beacon rather than giving guidance. Also known as a potential replacement to ILS is Ground Based Augmentation System GBAS, which is a satellite based solution, but only gives a visual indication.

To address these issues, examples of this disclosure are arranged to coordinate the information presented to the pilot by diverse types of crew interface using senses of sight, sound and touch, via devices such as HUD/HMD/HDD, audio such as 3D audio, and active stick and active throttle devices. This can provide a more integrated, holistic presentation to the pilot to give a better, more easily understood presentation of what the aircraft is doing and how it is flying with respect to the glideslope and runway for example, or with respect to the mission or flight plan. The coordination extends to changes in phase of the flight, such as from approach to touchdown, to braking, to taxiing, and to takeoff, then cruise, for example. So for example if there is an ILS (Instrument Landing System) then the display could be controlled to show ILS symbology showing deviation from the glideslope and possibly correction commands, to acquire and maintain the glideslope. At the same time, tactile feedback on the stick and perhaps on the rudder pedals could represent in a different way the same information, about maintaining the glideslope, and whether the aircraft should be higher or lower, and further right or left for example. For example the stick could be made easier to move in the desired direction, and harder to move in the wrong direction, or made to vibrate more. Corresponding audio output could also be used to reinforce the guidance, in the form of varying tones or voices.

By coordinating the multiple diverse crew interface types, the pilot can be provided with a more coherent view of the current state of the flight with lowered risk of overload of incoherent information. The coordinated visual, audio and tactile outputs can be generated from a unified source which can be implemented either as centralised processor or processors, or as a distributed function or agent, run at multiple interconnected locations, such as the diverse output devices, with communications to ensure mutual consistency and uniformity of the presentations by the diverse types of interfaces. The crew interface devices can include but are not limited to, displays such as HUD/HMD/HDD, and tactile devices in the form of active inceptors such as a stick, throttle and rudder pedals, and 3-D audio loudspeakers or headsets. Examples of the system can provide a homogenised multisensory crew interface by collating information from multiple inputs to derive a unified estimate of a current phase of flight. Using this and flight status information, such as position, attitude, speed, height, predicted trajectory and so on, guidance or warnings or other information can be presented to the pilot, appropriate to the phase of flight, and coordinated across the different senses of touch, sight and sound. These coordinated visible, tactile and audio presentations can help simplify the task of the pilot by reducing the effort needed to resolve any inconsistencies or incoherencies across the different types of crew interface. Thus, the risk of the pilot becoming overloaded or confused and thus compromising the mission or safety of the flight can be reduced, or more pilot effort becomes available for other tasks.

FIG. 1 shows a schematic view showing a system according to a first embodiment having a controller for controlling outputs of diverse types of crew interfaces 70, 400-450, and implemented by processor circuitry 80, coupled to memory circuitry 60. The processor is also coupled to the diverse types of crew interface hardware 70, 400-450. Some of the various functions of the system are shown as processes held in the memory as programs for execution by the processor circuitry, though of course the functions can be implemented in other ways such as programmable or dedicated logic of any kind. Also, the processes shown can be integrated together or subdivided in other ways. The processes shown include a process 30 for handling inputs from aircraft systems. This can include inputs such as speed, position, height, position of flight control surfaces, position of undercarriage, attitude, and so on following established practice and depending on the type of aircraft.

This process can output flight status information which can include the raw data from the aircraft systems and processed data such as predictions of trajectory, braking distances, takeoff points, flight plan or mission plan information and so on. A process in the form of a reasoning engine 10 is provided to determine a unified estimate of current aircraft state and phase of flight from at least some of the flight status information. Optionally the reasoning engine can have input from a process 40 of handling inputs from the human pilot, such as a change in flight plan, or the pilot initiating a change in phase such as starting to taxi or starting to takeoff for example.

Determining the phase of flight can be from various inputs including, but not limited to: Speed, Height above the ground, Position with respect to an airfield/runway, Weight on Wheels, flaps position. For example, to determine that the aircraft is in the taxi phase then Weight on Wheels should be present, speed less than an agreed reference speed, height above ground is zero, or if it's the Inertial Navigation System INS position, the height of the INS matches the installed INS height. A second example, for the approach phase can be based on the flap position being configured for landing, speed matching the reference speed for landing, the aircraft position with respect to the airfield/runway, and the height above ground being less than that expected for the start of descent.

The process 40 for handling inputs from the human pilot is also arranged to feed control outputs to a process 50 for controlling aircraft systems such as engines, flight control surfaces FCS, radios, fuel systems, hydraulic systems, electrical generator systems, pressurisation systems and many other systems.

The unified estimate of current aircraft state and current phase of flight is used by processes 20 for generation of the coordinated visual, audio and tactile presentations for the diverse types of crew interfaces 70 according to the unified estimation of current aircraft state and current phase of flight information. The presentations are coordinated at least in the sense that the visible, audio and tactile presentations provide mutually consistent indications of the aircraft state. The indications presented can depend on the phase of flight, and in some cases, there is a benefit in keeping these indications synchronised with changes in the unified estimation of current phase of flight. As will be explained in more detail below with respect to each of the phases of flight, the particular information they present depends on the unified estimations of current aircraft state and of the current phase of flight.

As shown, in this example the visual type crew interfaces include an HUD 400, an HMD 410 and an HDD 420. The tactile type crew interfaces include a stick 430, and a throttle 440, and could include rudder pedals (not shown for the sake of clarity/conciseness) which could have a similar tactile output corresponding to that of the stick, or have their own output, for example for the final part of the approach in a cross wind where the rudder pedals are typically used to straighten up the plane just before touch down. Hence, throughout this disclosure references to generating a stick tactile output are intended to encompass a rudder pedal tactile output also. The audio type includes audio speakers 450 such as headsets or cockpit loudspeakers, either of which can be arranged to provide directional audio known as 3D audio.

An advantage of such coordinating of crew interface outputs across sight, sound and touch senses is that it can relieve the pilot of workload in interpreting unsynchronised or incoherent outputs from different types of interfaces which might confuse the pilots understanding of the current aircraft state or phase. Thus there is less workload for the pilot if they no longer have to apply detailed knowledge and integrate various interface possibly incoherent outputs to judge the situation and understand immediately the status of the aircraft and what should be done. This can lead to less risk of the pilot becoming overloaded or confused and thus compromising the mission or the safety of the flight for example.

Note that the references to aircraft can encompass any kind of aircraft powered or unpowered, manned or remotely piloted drone types, including rocket powered craft or spacecraft, and so on. References to pilot can encompass humans who have control of the flight but from a remote location, such as pilots of unmanned drones. References to tactile output can include any type of tactile output (also called haptic interface) including vibration, resistance to movement, directionally variable resistance to movement, resistance to rotation and so on.

Figure 2:
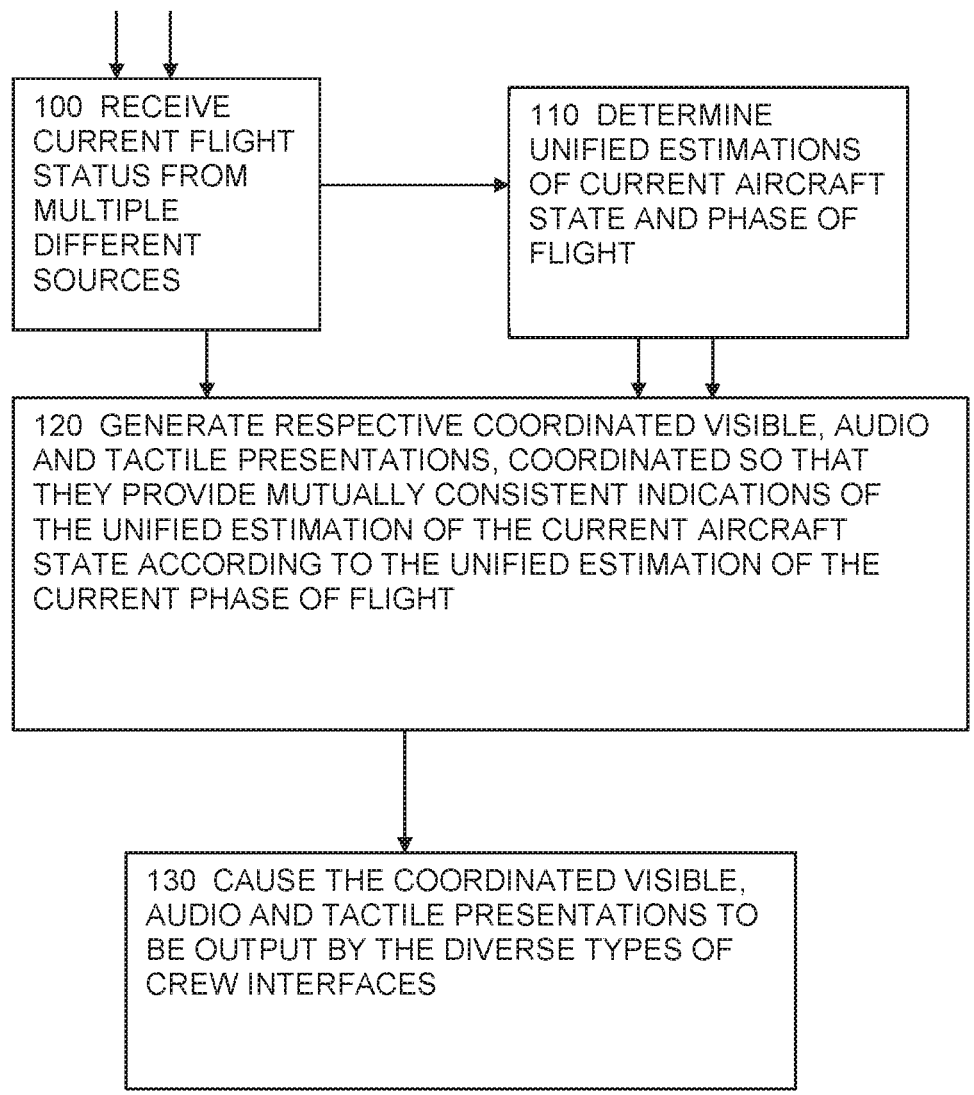
FIG. 2 shows method steps according to an embodiment.

FIG. 2 shows method steps according to an embodiment, for use in the embodiment of FIG. 1 or in other embodiments. The method is for controlling respective outputs of diverse types of crew interfaces for outputting visible, audio and tactile information to a human pilot for flight control of an aircraft. There is a step 100 of receiving flight status information from multiple different sources. This can include any status information about the aircraft or about the situation of the aircraft such as flight plan or position relative to flight plan for example. At step 110 there is a step of determining unified estimations of current aircraft state and the current phase of flight, based on at least the flight status information. This can be carried out by the reasoning engine of FIG. 1, or by some other process in a different embodiment. As shown by step 120 there is a step of generating respective coordinated visible, audio and tactile presentations for the diverse types of crew interfaces, coordinated so that they provide mutually consistent indications of the unified estimate of current aircraft state, according to the unified estimation of current phase of flight. There are various ways that such coordination of presentations can be implemented and some examples and variations will be described in more detail below. At step 130, there is a step of causing the respective coordinated presentations to be output by the diverse types of crew interfaces to the human pilot. As set out above, a notable advantage of such coordinating of crew interface outputs across sight, sound and touch senses is that it can relieve the pilot of workload in interpreting unsynchronised or incoherent outputs from different types of interfaces.

Figure 3:
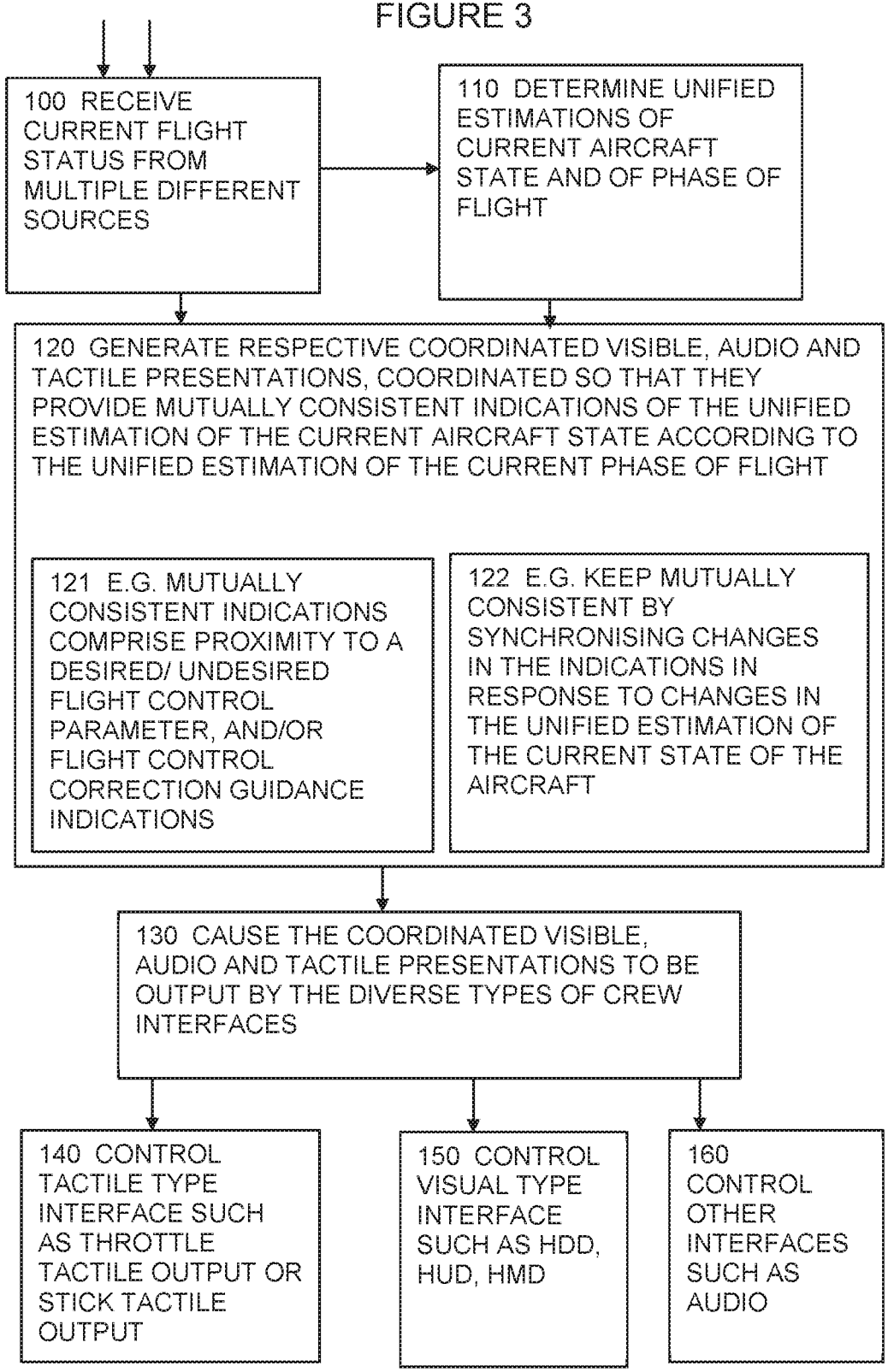
FIG. 3 shows method steps for an example having at least tactile and visual types.

FIG. 3 shows an example similar to FIG. 2, and corresponding reference numerals have been used as appropriate. In this case, within the box 120 showing the step of generating the coordinated presentations providing the mutually consistent indications are boxes 121 and 122 showing examples for implementing such generating of the presentations. In box 121 the presentations generated provide mutually consistent indications of proximity to a desired or undesired flight control parameter, and/or flight control correction guidance. These are types of indications which are particularly useful in enabling the pilot to understand the aircraft state, and which have the potential to cause some confusion if not kept consistent. The desired flight parameters might encompass speed, height, location and track as per a flight plan or a glideslope on approach to a runway for example. The undesired flight parameters can encompass thresholds such as a stall speed, runway limits, flight path boundaries such as height and position and so on. The flight control correction guidance information can include for example which way to steer to reach a centre of a glidepath, or centre of a taxiway for example, or whether a throttle setting should be increased or decreased for example. The particular indications presented will typically depend on the current phase of flight and more details of examples of indications specific to each phase of flight are shown in FIGS. 6 to 11 and described below.

Figure 4:
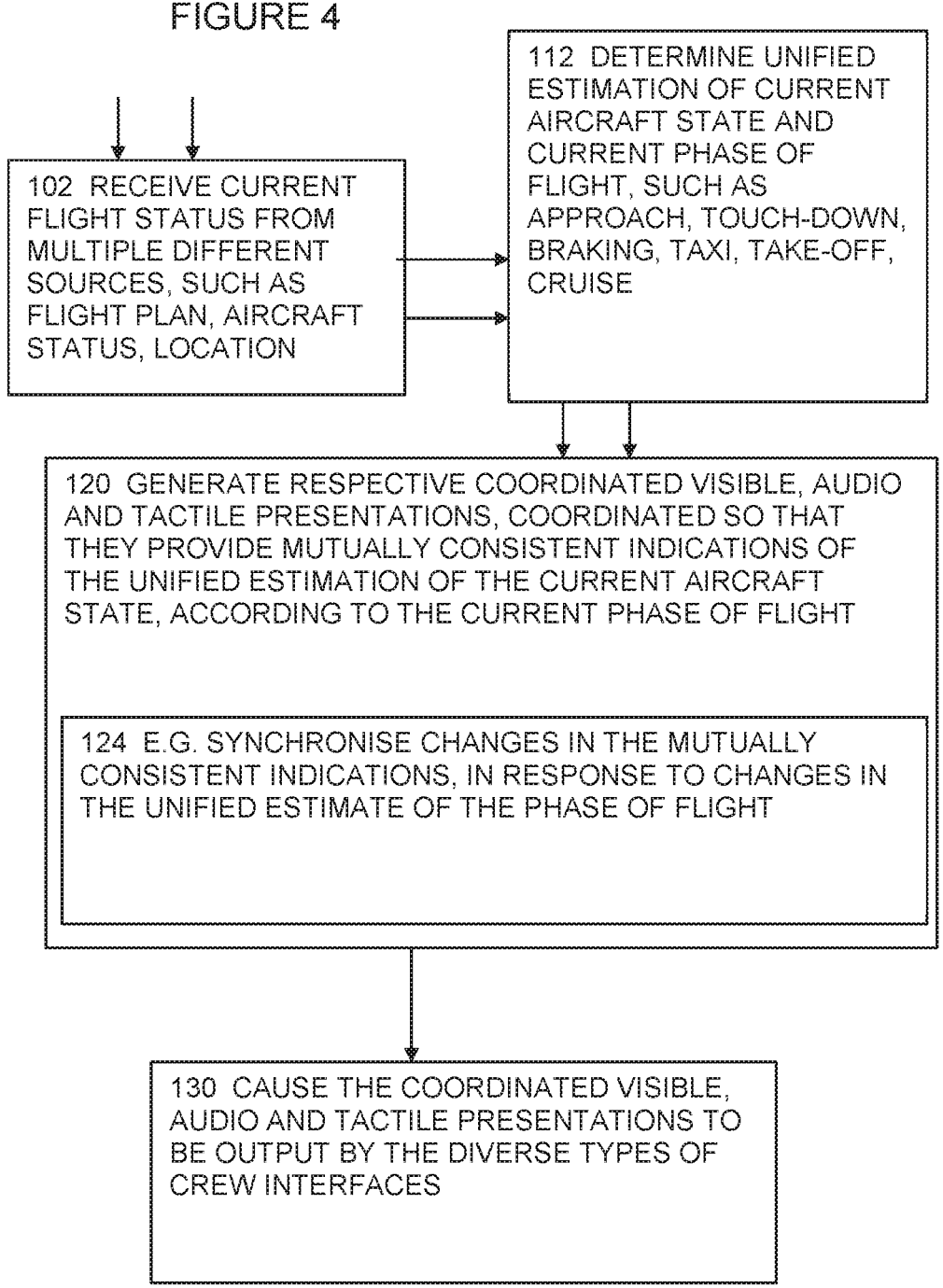
FIG. 4 shows method steps for an example having options of particular flight status, particular phases, and/or synchronised changes.

Box 122 shows an example in which the presentations generated can be kept mutually consistent by synchronising changes in the indications in response to changes in the unified estimation of the current aircraft state. In this way, temporary inconsistencies between the respective audio, visual and tactile presentations as the aircraft state changes can be minimised, and any resulting confusion in the mind of the pilot can thus also be minimised. There is a similar benefit in synchronising in response to changes in phase of flight, as shown in FIG. 4 described below. The examples in boxes 121 and 122 are not mutually exclusive and so can be alternatives or can be combined.

Also shown in FIG. 3 are examples of control steps to control each type of crew interface, to implement the step 130 of causing the presentations to be output by the crew interfaces. So there is shown a step 140 of controlling a tactile type interface such as a throttle tactile output or stick tactile output or rudder pedal for example to vibrate or show variable resistance force to movement by the user. There is also a resulting step 150 of controlling a visual type interface such as an HUD, HMD, or HDD, and a step 160 of controlling any other interfaces such as audio or 3D audio. An advantage of coordinating these devices is that they are some of the more established interface types and so the benefit from the coordination of them is particularly strong.

FIG. 4 shows an example similar to FIG. 2, and corresponding reference numerals have been used as appropriate. In this case, the step 120 of generating the respective coordinated visible, audio and tactile presentations comprises the optional addition shown in step 124 of making synchronised changes in the mutually consistent indications in response to changes in the unified estimation of current phase of flight. An advantage is that this can help emphasise changes in phase and reduce risk of inconsistency and thus confusion during a change in phase, which is often a time of high pilot workload.

Another optional additional feature shown here is the step of receiving current flight status 102 involves multiple sources such as at least a flight plan, a current location, and aircraft status information. An advantage of this is that it can help enable an accurate estimation of phase and thus also help reduce risk of inconsistency and thus confusion during a change in phase, which is often a time of high pilot workload.

Another optional additional feature shown here in step 112 is the step of determining a unified estimate of current phase of flight involving determining the phase is one of: a take off phase, a cruise phase, an approach phase, a touch down phase, a braking phase and a taxi phase. There are some of the main phases though other ways of dividing into phases can be envisaged.

Figure 5:
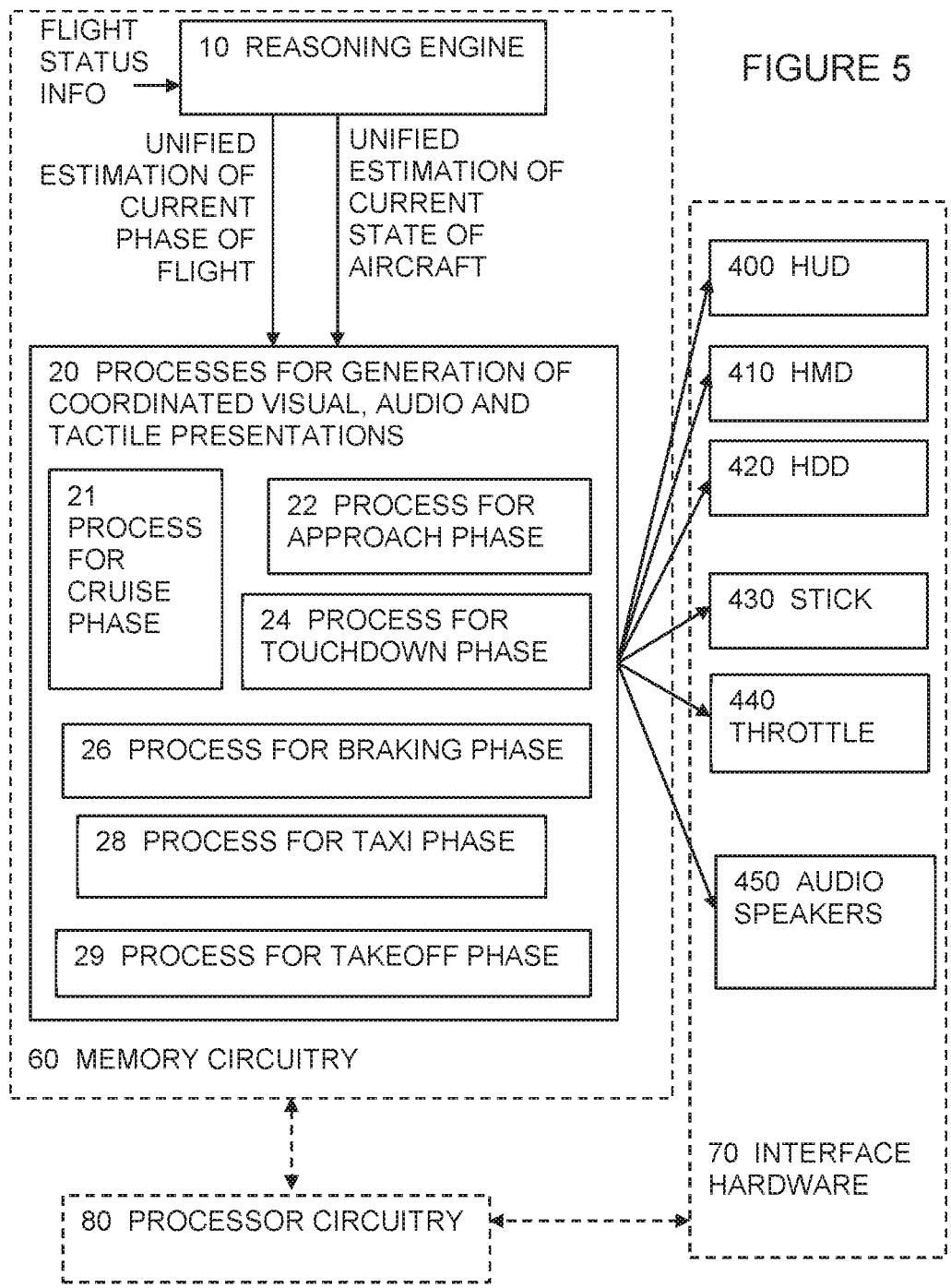
FIG. 5 shows a schematic view of embodiment showing processes for different phases.

FIG. 5 shows a schematic view of an embodiment showing features similar to those of FIG. 1 and corresponding reference numerals have been used as appropriate, though some optional features have been omitted for clarity. In this case the processes 20 for generation of the coordinated visual, audio and tactile presentations is shown as comprising a number of alternative processes each corresponding to a different phase. There is a process 21 for use in the cruise phase, described in more detail below with reference to FIG. 11, and a process 22 for use in the approach phase, which is described in more detail below with reference to FIG. 6. There is a process 24 for use in the touchdown phase, described in more detail below with reference to FIG. 7. There is a process 26 for use in the braking phase, which is described in more detail below with reference to FIG. 8. There is a process 28 for use in the taxi phase, described in more detail below with reference to FIG. 9, and a process 29 for use in the takeoff phase, described in more detail below with reference to FIG. 10.

Figure 6:
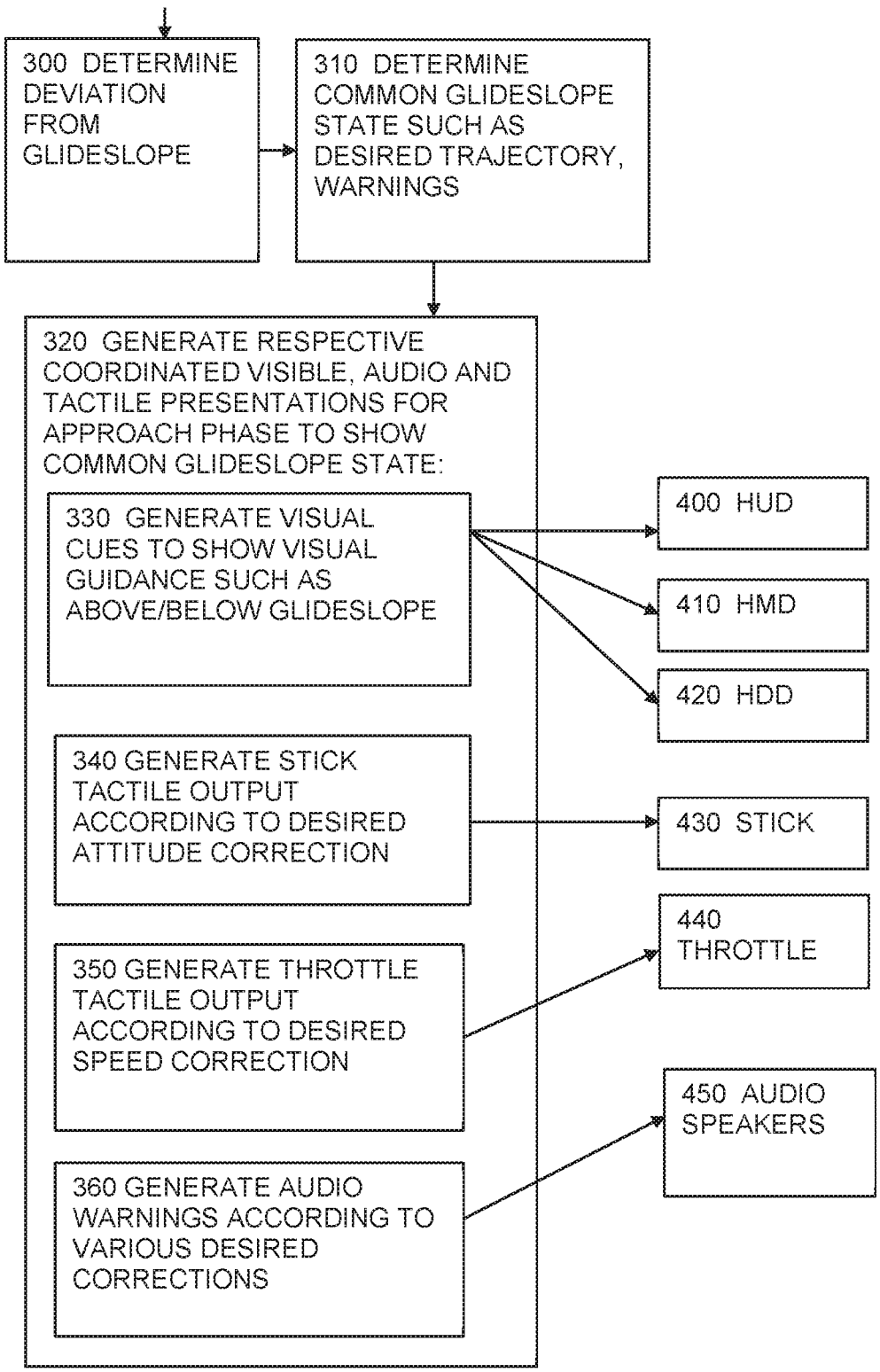
FIG. 6 shows a schematic view of an example for an approach phase.

FIG. 6 shows steps for coordinated control of outputs according to an example for an approach phase. At step 300 there is a step of determining deviation from a glideslope, based on flight status inputs such as navigation information (NAV), Instrument Landing System ILS input, and Ground Based Augmentation System GBAS input. At step 310 there is a step of determining a common glideslope state such as a desired trajectory or desired corrections to speed, direction, height, attitude and so on. This is an example of part of a unified estimation of current aircraft state. At step 320 there is a step of generating the respective coordinated visible, audio and tactile presentations for the approach phase, to provide consistent indications of the aircraft state, in the form of the common glideslope state. This involves, at step 330 generating visual guidance output for display, based on the common glideslope state. This can involve for example indications such as cues to show speed and/or position and/or direction and/or attitude in the form of actual value or relative to desired, or desired correction for example. The output is indicated by arrows to the HUD 400, HMD 410 and HDD 420, and can represent output to any combination of some or all of these interfaces. There may also be a further visual warning or an emphasis of an existing cue if a limit or threshold of acceptable proximity to glideslope is reached.

At step 340 there is shown a step of generating a stick tactile output according to the common glideslope state such as a desired attitude correction. This indication can be coordinated with the visual and other presentations in terms of being based on the same information and being consistent with any visual presentation regarding attitude, and by presenting warnings at the same time for example. The output is shown as an arrow to the stick 430. At step 350 there is a step of generating throttle tactile output according to the common glideslope guidance such as a desired speed correction. This may be coordinated with the other crew interface outputs for example by being consistent with any visual indication regarding speed, and by presenting warnings at the same time. The output is shown as an arrow to the throttle 440. At step 360 there is a step of generating audio warnings according to the common glideslope state. The output is shown as an arrow to the audio speakers 450. An advantage of providing such glideslope guidance indications coordinated across multiple types of interface is that it can help the pilot to understand the situation with less risk of confusing incoherent information from different systems. One aspect of the coordination is that all indications can change phase at the same time, to enter or exit the approach phase for example, so that a coherent impression is presented.

Figure 7:
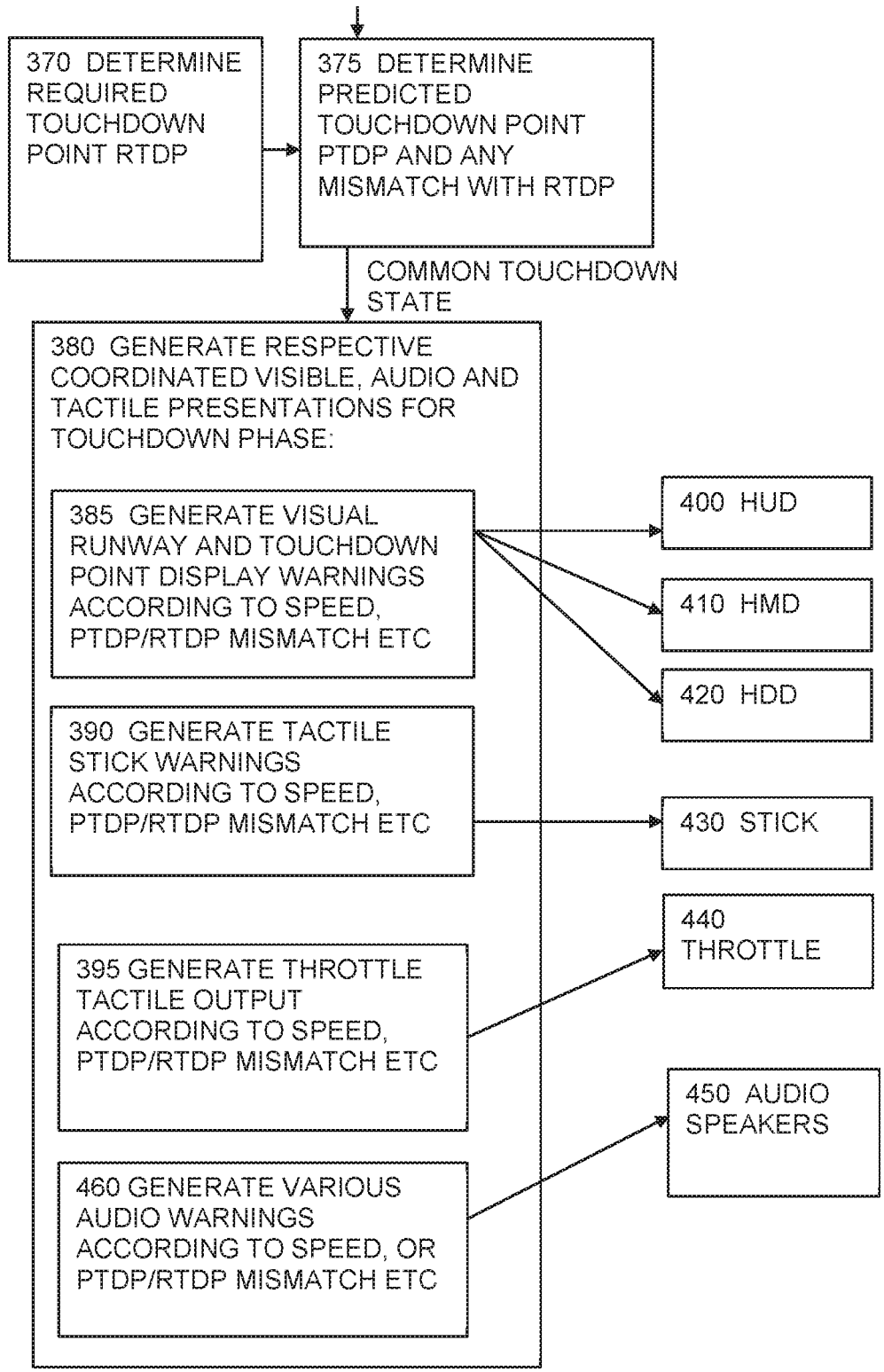
FIG. 7 shows a schematic view of an example for a touchdown phase.

FIG. 7 shows steps for coordinated control of outputs according to an example for a touchdown phase. At step 370 there is a step of determining a required touchdown point RTDP. At step 375 there is a step of determining a predicted touchdown point PTDP and any mismatch with the RTDP, and outputting a common touchdown state. This is an example of part of the unified estimation of current aircraft state. At step 380 there is a step of generating the respective coordinated visible, audio and tactile presentations for the touchdown phase, to indicate the current aircraft state, in the form of such common touchdown state. This involves, at step 385 generating visual runway and touchdown point display, and any warnings, based on the common touchdown state such as speed and PTDP/RTDP mismatch for example. The output is indicated by arrows to the HUD 400, HMD 410 and HDD 420, and can represent output to any combination of some or all of these interfaces. There may also be a further visual warning or an emphasis of an existing cue if a limit or threshold of acceptable trajectory is reached.

At step 390 there is shown a step of generating a stick tactile output according to the common touchdown state such as a desired attitude correction, speed and PTDP/RTDP mismatch for example. This can be coordinated with the visual and other presentations in terms of being based on the same information and being consistent with any visual presentation regarding attitude, and by presenting warnings at the same time for example. The output is shown as an arrow to the stick 430. At step 395 there is a step of generating throttle tactile output according to the common touchdown state such as a desired speed correction, and PTDP/RTDP mismatch for example. This may be coordinated with the other crew interface outputs for example by being consistent with any visual presentation regarding speed, and by presenting warnings at the same time. The output is shown as an arrow to the throttle 440. At step 460 there is a step of generating audio warnings according to the common touchdown state such as according to speed or PTDP/RTDP mismatch and so on. The output is shown as an arrow to the audio speakers 450. As before, providing such touchdown warnings coordinated across multiple types of interface is particularly useful to help the pilot to understand the situation with less risk of confusing incoherent information from different systems.

Figure 8:
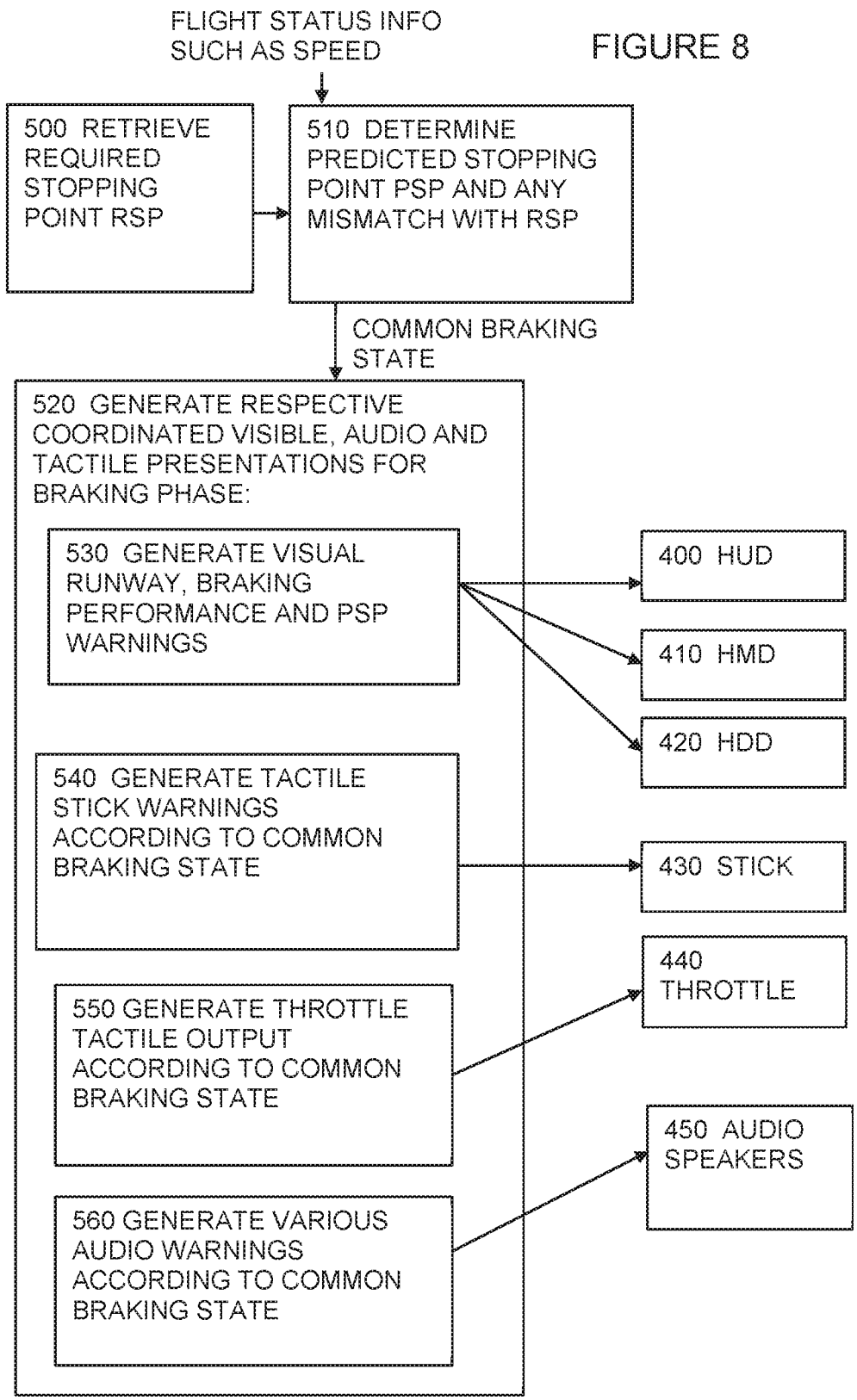
FIG. 8 shows a schematic view of an example for a braking phase.

FIG. 8 shows steps for coordinated control of outputs according to an example for a braking phase. At step 500 there is a step of determining a required stopping point RSP. At step 510 there is a step of determining a predicted stopping point PSP and any mismatch with the RSP, based on flight status such as speed, and outputting these as a common braking state. This is an example of part of the unified estimation of current aircraft state. At step 520 there is a step of generating the respective coordinated visible, audio and tactile presentations for the braking phase, to indicate the current aircraft state, in the form of such common braking state. This involves, at step 530 generating a visual representation of the runway, braking performance and PSP warnings, for example, based on the common braking state. The output is indicated by arrows to the HUD 400, HMD 410 and HDD 420, and can represent output to any combination of some or all of these interfaces. There may also be a further visual warning or an emphasis of an existing cue if a limit or threshold of acceptable braking is reached, or if steering too close to the edge of the runway for example.

At step 540 there is shown a step of generating a stick tactile output according to the common braking state such as by providing stick shaker warnings or other tactile warnings. This can be coordinated with the visual and other indications in terms of being based on the same information and being consistent with any visual indication, and by presenting warnings all at the same time for example. The output is shown as an arrow to the stick 430. At step 550 there is a step of generating throttle tactile output according to the common braking state such as a desired speed correction. This may be coordinated with the other crew interface outputs for example by being consistent with any visual indication regarding speed, and by presenting warnings at the same time. The output is shown as an arrow to the throttle 440. At step 560 there is a step of generating audio warnings according to the common braking indications such as according to speed or PSP/RSP mismatch and so on. The output is shown as an arrow to the audio speakers 450. An advantage of providing such braking phase presentations coordinated across multiple types of interface is in helping a pilot to understand the situation with less risk of confusing incoherent information from different systems.

Figure 9:
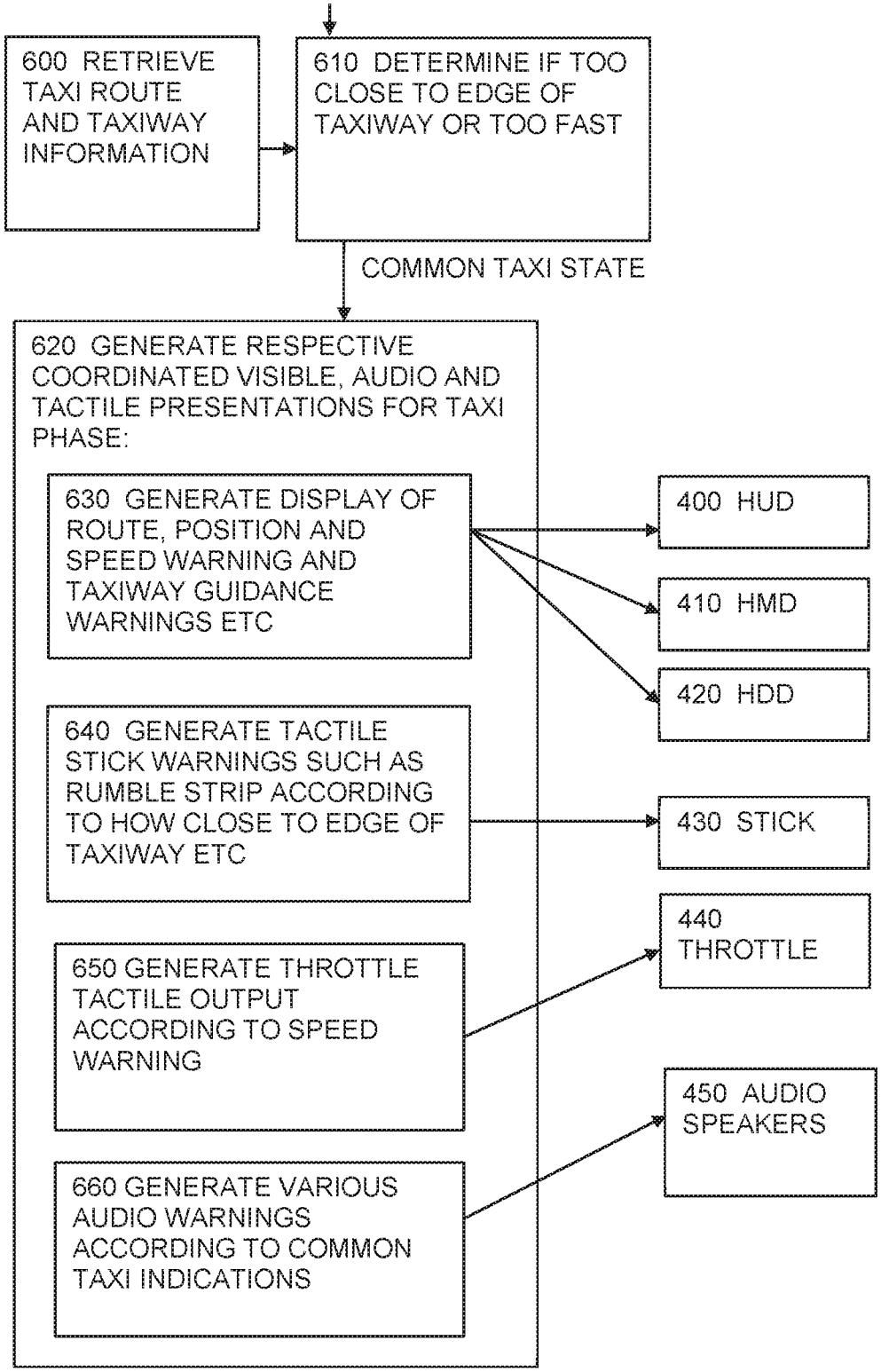
FIG. 9 shows a schematic view of an example for a taxi phase.

FIG. 9 shows steps for coordinated control of outputs according to an example for a taxi phase. At step 600 there is a step of retrieving a taxi route and taxiway information. At step 610 there is a step of determining if too close to the edge of the runway, or if going too fast based on flight status such as speed and position, and outputting such information as common taxi state for use by all the interface types. This is an example of part of determining the unified estimation of current aircraft state. At step 620 there is a step of generating the respective coordinated visible, audio and tactile presentations for the taxi phase, to indicate the current aircraft state in the form of such common taxi state. This involves, at step 630 generating a visual representation of the route, position and speed warnings, for example, to indicate the current aircraft state, in the form of the common taxi state. The output is indicated by arrows to the HUD 400, HMD 410 and HDD 420, and can represent output to any combination of some or all of these interfaces. There may also be a further visual warning or an emphasis of an existing cue if a limit or threshold along the taxi route is reached.

At step 640 there is shown a step of generating a stick tactile output according to the common taxi state such as by providing a synthetic rumble strip if the aircraft veers too far from a runway centre line for example. This can be coordinated with the visual and other presentations in terms of being based on the same information and being consistent with any visual presentation, and by presenting warnings all at the same time for example. The output is shown as an arrow to the stick 430. At step 650 there is a step of generating throttle tactile output according to the common taxi state such as when the speed is too high or by providing a detente at a desired throttle setting. This may be coordinated with the other crew interface outputs for example by being consistent with any visual presentation regarding speed, and by presenting warnings at the same time. The output is shown as an arrow to the throttle 440. At step 660 there is a step of generating audio warnings according to the common taxi state such as verbal braking messages or warnings of thresholds and so on. The output is shown as an arrow to the audio speakers 450. As before, an advantage of providing such taxi phase indications coordinated across multiple types of interface is particularly useful to help the pilot to understand the situation with less risk of confusing incoherent information from different systems. In some examples the tactile output may provide an indication to the pilot of an approaching hazard. For example the tactile output may comprise a nudge to the control device to identify an imminent turn, or a soft stop to discourage wrong turns, or a combination of nudges and soft stops. In some examples a pilot may be alerted to a stop bar by at least a soft stop. In some examples an audible or visual warning may be displayed at substantially the same time to the tactile output, such as a flashing warning arrow pointing in or away from the direction of the hazard or deviation, the flash synchronised with the stick tactile output. This may assist the pilot to understand the significance of the warning, and to reduce the chance of the warning being ignored or not acted upon. The precise feel of the tactile output may be programmed to convey the urgency or the severity of the hazard, in a range of scenarios. Although the approaching hazard is discussed in relation to the taxiing phase, it is evident that the tactile output may be provided to the pilot during any aircraft state, for example a nudge may be provided to ensure that an aircraft stays on a flight path.

In some examples the control device may be configured to have a variable feel depending on the speed of the aircraft. In some examples a tactile feedback may be provided in the form of a simulated rumble strip if the aircraft speed is over a specified limit, such as speed limit set by the operators of the aircraft to potentially reduce maintenance costs, or a speed limit set by air traffic control. The tactile feedback may increase with the magnitude of the aircraft speed.

In some examples the stick may be functioning to control nosewheel steering of the aircraft. In these examples the stick tactile output may comprise a soft stop. The soft stop may be provided via the stick to the pilot at an appropriate position of the stick to prevent damage or reduce wear to an aircraft if the pilot was to push past the stop. For example where oversteer may be caused which could scuff or wear the tyre a stop could be added, such that the pilot would be required to actively push past the stop if they desired to continue to move the stick. At the same time as the stop, a warning may be provided to the pilot, such as a visual or audible warning. This would assist the pilot to avoid actions which may cause unaccepted levels of wear, but still allow the pilot to take any action they decided was necessary, for example avoiding a hazard in an emergency.

Figure 12:
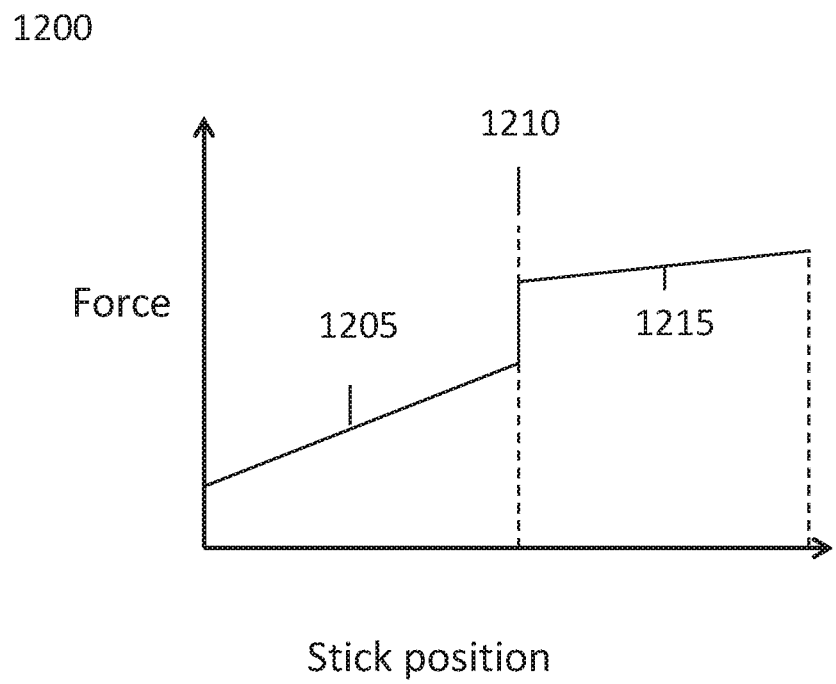
FIG. 12 shows an illustration of a tactile output according to some examples.

A soft stop 1200 is illustrated in FIG. 12. In some examples, when providing a soft stop the stick is configured to provide a resistive force which varies with stick position. The stick may provide a resistive force that has a substantially linear first gradient 1205 with stick position in one axis. At a predefined soft stop position 1210 the gradient increases to a second gradient, and therefore the user will feel increased resistance to moving the stick. The gradient then reduces after soft stop position 1210 to a third gradient 1215. The second gradient is higher than the first 1205 and third gradients 1215. The first gradient 1205 may be equal to or higher than the third gradient, although the first gradient 1205 may also be lower than the third gradient 1215. In some examples the third gradient 1215 may be lower than the first gradient 1205 such that the force required to reach the hard stop is equal to the projected force of the first gradient 1205.

Although the first 1205, second and third gradients 1215 are shown as being linear, they may have any shape.

Figure 13:
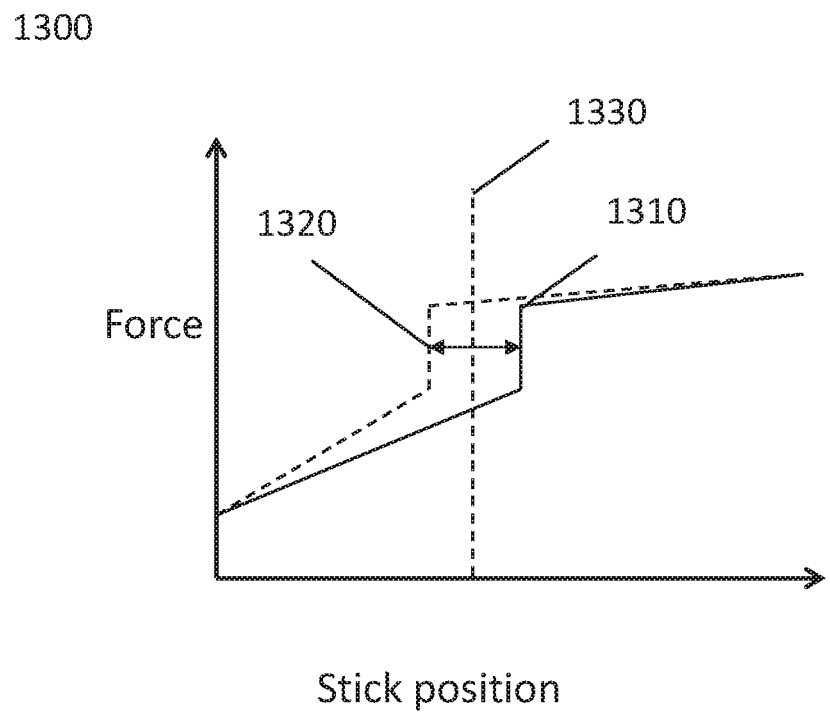
FIG. 13 shows a further illustration of a tactile output according to some examples.

A nudge 1300 is illustrated in FIG. 13. In some examples, when providing a nudge the stick is configured to provide a resistive force. Similar to the soft stop, the stick is configured to provide a soft stop at first soft stop position 1310 when the stick is in a first position 1330 before first soft stop position 1310. To provide a nudge, the position of first soft stop position 1310 may be momentarily moved for a time T such that it occurs at a second position 1320 before the first position 1330. The user will feel a force that attempts to move the stick according to the new force profile. Once the position of the soft stop moves back to the first soft stop position 1310, the user will no longer feel the increased force, and in this manner the user of the stick will feel a nudge. The severity of the nudge may be increased by increasing the time T that the stick position is changed and also increasing the difference between the first soft stop position and the nudge position.

Figure 10:
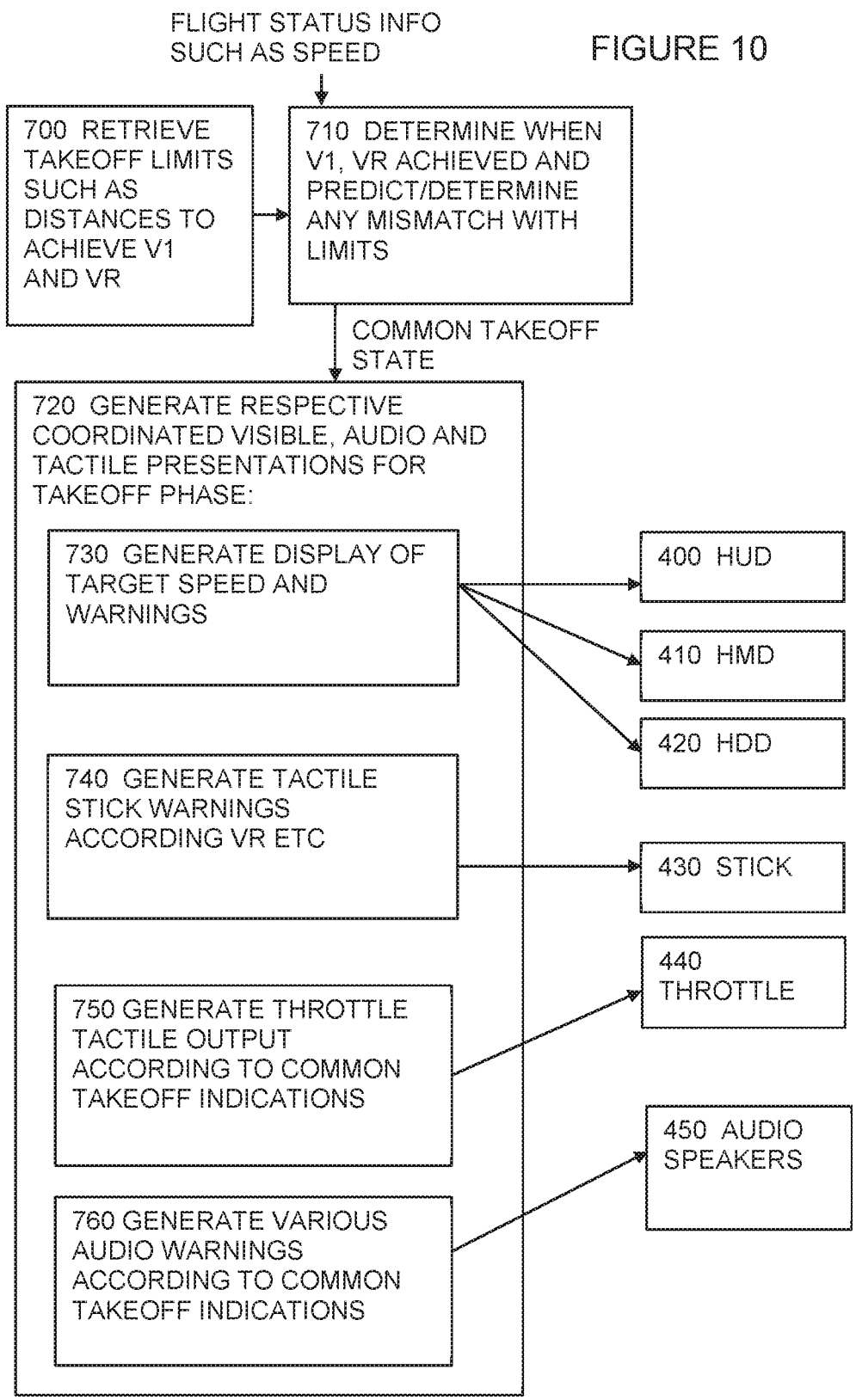
FIG. 10 shows a schematic view of an example for a takeoff phase.

FIG. 10 shows steps for coordinated control of outputs according to an example for a takeoff phase. At step 700 there is a step of retrieving takeoff limits such as distances or points on the runway relating to V1 (takeoff abort decision limit) and VR (rotation velocity). At step 710 there is a step of determining when V1 and VR are achieved and any mismatch with the takeoff limits, based on flight status such as speed and location, and outputting common takeoff state for use by all the types of interface. This is an example of part of determining the unified estimation of current aircraft state. At step 720 there is a step of generating the respective coordinated visible, audio and tactile presentations for the takeoff phase, to indicate the current aircraft state in the form of such common takeoff state. This involves, at step 730 generating a visual representation of for example actual speed and target speed and any warnings for example, based on the common takeoff state. The output is indicated by arrows to the HUD 400, HMD 410 and HDD 420, and can represent output to any combination of some or all of these interfaces. There may also be a further visual warning or an emphasis of an existing cue if a limit or threshold of acceptable braking is reached, or if steering too close to the edge of the runway for example.

At step 740 there is shown a step of generating a stick tactile output according to the common take-off state such as by providing stick shaker warnings or other tactile warnings as V1 and/or VR are reached for example. This can be coordinated with the visual and other indications in terms of being based on the same information and being consistent with any visual indication, and by presenting warnings all at the same time for example. The output is shown as an arrow to the stick 430. At step 750 there is a step of generating throttle tactile output according to the common take-off state such as by providing a detente at the desired throttle settings. This may be coordinated with the other crew interface outputs for example by being consistent with any visual presentation regarding speed, and by presenting warnings at the same time. The output is shown as an arrow to the throttle 440. At step 760 there is a step of generating audio warnings according to the common take-off state such as verbal messages indicating V1 or VR has been reached for example. The output is shown as an arrow to the audio speakers 450. An advantage of providing such take-off phase presentations coordinated across multiple types of interface is that they can help the pilot by reducing a risk of confusing incoherent information from different systems.

Figure 11:
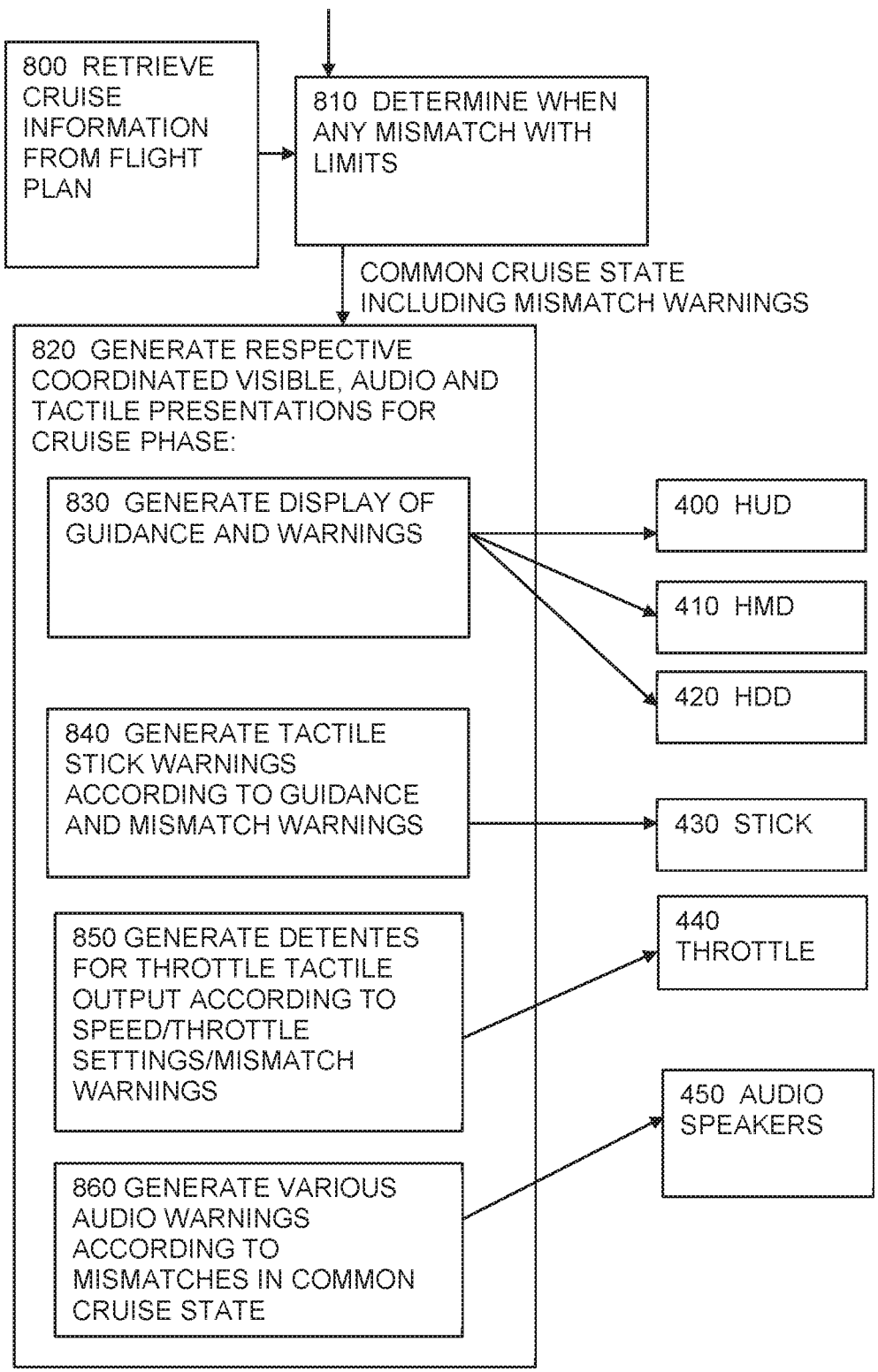
FIG. 11 shows a schematic view of an example for a cruise phase.

FIG. 11 shows steps for coordinated control of outputs according to an example for a cruise phase. At step 800 there is a step of retrieving cruise information from a flight plan. At step 810 there is a step of determining any mismatch with limits such as speed, height and location, and outputting a common cruise state including such mismatch warnings for use by all the types of interface. This is an example of part of determining the unified estimation of current aircraft state. At step 820 there is a step of generating the respective coordinated visible, audio and tactile presentations for the cruise phase, to indicate the current aircraft state in the form of such common cruise state. This involves, at step 830 generating a visual representation of for example actual speed and trajectory and target speed and trajectory and any warnings for example, to indicate the common cruise state. The output is indicated by arrows to the HUD 400, HMO 410 and HOD 420, and can represent output to any combination of some or all of these interfaces. There may also be a further visual warning or an emphasis of an existing cue if a limit or threshold of acceptable deviation from the flight plan is reached or approached.

At step 840 there is shown a step of generating a stick tactile output according to the common cruise state such as by providing stick shaker warnings or other tactile warnings as thresholds are reached for example. This can be coordinated with the visual and other indications in terms of being based on the same information and being consistent with any visual indication, and by presenting warnings all at the same time for example. The output is shown as an arrow to the stick 430. At step 850 there is a step of generating throttle tactile output according to the common cruise state such as by providing a detente at the desired throttle settings. This may be coordinated with the other crew interface outputs for example by being consistent with any visual presentation regarding speed, and by presenting warnings at the same time. The output is shown as an arrow to the throttle 440. At step 860 there is a step of generating audio warnings according to the common cruise state such as verbal messages indicating a threshold is being approached or reached for example. The output is shown as an arrow to the audio speakers 450. An advantage of providing such cruise phase presentations coordinated across multiple types of interface is that they can help the pilot by reducing a risk of confusing incoherent information from different systems.

Although the apparatus has been described in relation to FIGS. 1 and 5 as implemented by processes run by a processor and memory, other implementations can be envisaged, so the features can be described as apparatus for controlling respective outputs of diverse types of crew interfaces for outputting visible, audio and tactile information to a human pilot for flight control, the apparatus having a receiver for receiving flight status information, means for determining unified estimations of the current aircraft state and of the current phase of flight, based on at least the flight status information, means for generating respective coordinated visible, audio and tactile presentations of the information to the human pilot by the diverse types of crew interfaces, coordinated so that they provide mutually consistent indications of the unified estimation of the current aircraft state, according to the unified estimation of current flight phase, and means for causing the respective coordinated presentations to be output by the diverse types of crew interfaces to the human pilot. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

In some examples a method is provided for providing a warning to a user of an aircraft, the method comprising:
obtaining information regarding at least one hazard; and
providing a tactile output to a user control device of the aircraft in response to the at least one hazard.

In some examples the method further comprises providing a visual and/or audible warning to the user of the vehicle at substantially the same time as the tactile output.

In some examples the user control device is a flight stick operable to control flight surfaces of the aircraft during flight.

In some examples the aircraft is on the ground, such as in a taxiing phase or a braking phase.

In some examples the user control device and/or flight stick is operable to control nosewheel steering. In some examples the tactile output comprises at least one of: a soft stop; a nudge; an oscillation; and a simulated rumble strip.

In some examples the simulated rumble strip may be provided in response to an approaching hazard and/or if the aircraft speed is above an allowed speed.

In some examples the at least one hazard comprises a deviation from a planned route.

In some examples the tactile output in response to the deviation from the planned route may be a nudge in a direction that would move the aircraft towards the planned route.

In some examples the at least one hazard comprises a planned turn on a planned route.

In some examples a computer readable medium is provided, the computer readable medium comprising instructions, that when executed by a processor cause a method according to the above method to be performed.

The invention claimed is:

1. A method of controlling respective outputs of diverse types of crew interfaces for outputting visible, audio and tactile information to a human pilot for flight control of an aircraft, the method comprising:
receiving flight status information from multiple different sensors;
determining a unified estimation of a current aircraft state and a unified estimation of a current phase of flight, based on at least the flight status information from the multiple different sensors;
generating respective coordinated visible, audio and tactile presentations for the diverse types of crew interfaces, coordinated so that they provide mutually consistent indications of the unified estimation of the current aircraft state, according to the unified estimation of the current phase of flight, wherein generating the respective presentations comprises synchronizing changes in the mutually consistent indications of the unified estimation of the current aircraft state, in response to changes in the unified estimation of the current phase of flight, wherein synchronizing changes accounts for one or more inconsistencies between the multiple different sensors, and wherein the mutually consistent indications of the unified estimation of the current aircraft state comprises consistent indications of a proximity to a flight control parameter from the multiple different sensors; and
causing the respective coordinated presentations to be output by the diverse types of crew interfaces.

2. The method of claim 1, wherein the mutually consistent indications of the current aircraft state comprise mutually consistent indications of: proximity to a desired flight control parameter, proximity to an undesired flight control parameter, and/or flight control correction guidance.

3. The method of claim 1, wherein generating the respective presentations to provide the mutually consistent indications of the state of the aircraft comprises synchronizing changes in the indications in response to changes in the unified estimation of the current state of the aircraft.

4. The method of claim 1, the diverse types of crew interfaces comprising a visual type, an audio type and a tactile type, the visual type comprising a head down display, a head up display, and/or a head mounted display; the audio type comprising a headset and/or a cockpit loudspeaker; and the tactile type comprising a throttle tactile output, a rudder pedal tactile output, and/or a stick tactile output; wherein causing the respective coordinated presentations to be output comprises controlling these types of crew interface.

5. The method of claim 1, wherein the tactile type includes: at least one soft stop; a simulated rumble strip; and/or at least one nudge.

6. The method of claim 1, wherein a stick is operable to control nosewheel steering and the tactile type comprises a stick tactile output comprising: at least one soft stop, a simulated rumble strip; and/or at least one nudge.

7. The method of claim 1, wherein determining the unified estimations comprises determining the unified estimations based on flight status information comprising at least a flight plan, a current location, and aircraft status information.

8. The method of claim 1, wherein determining the unified estimation of current phase of flight comprises determining the phase is one of: a take-off phase, a cruise phase, an approach phase, a touch down phase, a braking phase and a taxi phase.

9. The method of claim 1, wherein:
in response to the current phase being an approach phase of flight, determining aircraft state comprises determining a common glideslope state; and
in response to the unified estimation of current phase of flight being an approach phase, generating the respective presentations comprises generating glideslope guidance indications in each of the coordinated tactile, audio and visual presentations, to indicate the common glideslope state.

10. The method of claim 1, wherein:
in response to the current phase being a touchdown phase of flight, determining aircraft state comprises determining a common touchdown state; and
in response to the unified estimation of current phase being a touchdown phase, generating the respective coordinated visible, audio and tactile presentations comprises generating touchdown warnings in each of the coordinated tactile, audio and visual presentations, to indicate the common touchdown state.

11. The method of claim 1, wherein:
in response to the current phase being a braking phase of flight, determining aircraft state comprises determining a common braking state; and
in response to the unified estimation of current phase of flight being a braking phase, generating the respective coordinated visible, audio and tactile presentations comprises deriving braking warning outputs in each of the tactile, audio and visual presentations, to indicate the common braking state.

12. The method of claim 1, wherein:
in response to the current phase being a taxi phase of flight, determining aircraft state comprises determining a common taxi state; and
in response to the unified estimation of current phase of flight being a taxi phase, generating the respective coordinated visible, audio and tactile presentations comprises deriving taxi guidance outputs for each of the tactile, audio and visual presentations, to indicate the common taxi state.

13. The method of claim 1, wherein:
in response to the current phase being a take off phase of flight, determining aircraft state comprises determining a common take off state; and
in response to the unified estimation of current phase of flight being a take off phase, generating the respective coordinated visible, audio and tactile presentations comprises deriving take off warning outputs for each of the tactile, audio and visual presentations, to indicate the common take off state.

14. The method of claim 1, wherein:
in response to the current phase being a cruise phase of flight, determining aircraft state comprises determining a common cruise state; and
in response to the unified estimation of current phase of flight being a cruise phase, generating the respective coordinated visible, audio and tactile presentations comprises deriving cruise warning outputs for each of the tactile, audio and visual presentations, to indicate the common cruise state.

15. A controller for controlling respective outputs of diverse types of crew interfaces for outputting visible, audio and tactile information to a human pilot for flight control, the controller having a processing circuit and a memory circuit, the memory circuit having instructions executable by the processing circuit, wherein said processing circuit when executing the instructions is configured to:
receive flight status information from multiple different sensors;
determine a unified estimation of current aircraft state, based on at least the flight status information from the multiple different sensors;
determine a unified estimation of a current phase of flight, based on at least the flight status information from the multiple different sensors;
generate respective coordinated visible, audio and tactile presentations for the diverse types of crew interfaces, coordinated so that they provide mutually consistent indications of the unified estimation of the current aircraft state, according to the unified estimation of the flight phase, wherein generating the respective presentations comprises synchronizing changes in the mutually consistent indications of the unified estimation of the current aircraft state, in response to changes in the unified estimation of the current phase of flight, wherein synchronizing changes accounts for inconsistencies between the multiple different sensors, and wherein the mutually consistent indications of the unified estimation of the current aircraft state comprises consistent indications of a proximity to a flight control parameter from the multiple different sensors; and
cause the respective coordinated presentations to be output by the diverse types of crew interfaces.

16. The controller of claim 15, wherein said processing circuit when executing the instructions is configured to:
generate the respective presentations to comprise an indication of proximity to a desired flight control parameter, proximity to an undesired flight control parameter, and/or flight control correction guidance.

17. The controller of claim 15, wherein said processing circuit when executing the instructions is configured so as to control crew interfaces comprising a visual type, an audio type, and a tactile type, the visual type comprising a head down display, a head up display, and/or a head mounted display; the audio type comprising a headset and/or a cockpit loudspeaker; and the tactile type comprising a throttle tactile output, a rudder pedal tactile output, and/or a stick tactile output.

18. The controller of claim 15, wherein said processing circuit when executing the instructions is configured to generate the respective presentations by synchronizing changes in the mutually consistent indications of the state of the aircraft, in response to changes in the unified estimation of current phase of flight.

19. The controller of claim 15, wherein said processing circuit when executing the instructions is configured to determine the unified estimations based on flight status information comprising at least a flight plan, a current location, and aircraft status information.

20. The controller of claim 15, wherein said processing circuit when executing the instructions is configured to determine the phase is one of: a take-off phase, a cruise phase, an approach phase, a touch down phase, a braking phase and a taxi phase.

21. A crew interface system having diverse types of crew interfaces coupled to the controller of claim 15.

22. One or more non-transitory machine-readable mediums encoded with instructions that when executed by one or more processors cause a process to be carried out for controlling respective outputs of diverse types of crew interfaces for outputting visible, audio and tactile information to a human pilot for flight control of an aircraft, the process comprising:
receiving flight status information from multiple different sensors;
determining a unified estimation of a current aircraft state and a unified estimation of a current phase of flight, based on at least the flight status information from the multiple different sensors;
generating respective coordinated visible, audio and tactile presentations for the diverse types of crew interfaces, coordinated so that they provide mutually consistent indications of the unified estimation of the current aircraft state, according to the unified estimation of the current phase of flight, wherein generating the respective presentations comprises synchronizing changes in the mutually consistent indications of the unified estimation of the current aircraft state, in response to changes in the unified estimation of the current phase of flight, wherein synchronizing changes accounts for inconsistencies between the multiple different sensors, and wherein the mutually consistent indications of the unified estimation of the current aircraft state comprises consistent indications of a proximity to a flight control parameter from the multiple different sensors; and
causing the respective coordinated presentations to be output by the diverse types of crew interfaces thereby allowing for consumption of the respective coordinated presentations by the human pilot.

23. The one or more non-transitory machine-readable mediums of claim 22, wherein the mutually consistent indications of the current aircraft state comprise mutually consistent indications of: proximity to a desired flight control parameter, proximity to an undesired flight control parameter, and/or flight control correction guidance, and wherein the diverse types of crew interfaces comprise a visual type, an audio type and a tactile type, the visual type comprising a head down display, a head up display, and/or a head mounted display; the audio type comprising a headset, a loudspeaker, a headset configured to provide directional audio, and/or a loudspeaker configured to provide directional audio; and the tactile type comprising a throttle tactile output, a rudder pedal tactile output, and/or a stick tactile output; and wherein causing the respective coordinated presentations to be output comprises controlling these types of crew interfaces.

\* \* \* \* \*